United States Patent
Lee et al.

(10) Patent No.: US 11,642,747 B2
(45) Date of Patent: May 9, 2023

(54) ALIGNING PARTS USING MULTI-PART SCANNING AND FEATURE BASED COORDINATE SYSTEMS

(71) Applicant: The Boeing Company, Chicago, IL (US)

(72) Inventors: Byungwoo Lee, Cupertino, CA (US); Michael Yee-Chih Wang, Bellevue, WA (US)

(73) Assignee: The Boeing Company, Chicago, IL (US)

( * ) Notice: Subject to any disclaimer, the term of this patent is extended or adjusted under 35 U.S.C. 154(b) by 602 days.

(21) Appl. No.: 16/695,529

(22) Filed: Nov. 26, 2019

(65) Prior Publication Data

US 2020/0094359 A1    Mar. 26, 2020

Related U.S. Application Data

(63) Continuation of application No. 15/014,740, filed on Feb. 3, 2016, now Pat. No. 10,556,305.

(51) Int. Cl.
    *B23P 19/10*            (2006.01)
    *B23P 11/00*            (2006.01)
    (Continued)

(52) U.S. Cl.
    CPC .............. *B23P 19/10* (2013.01); *B23K 37/04* (2013.01); *B23P 11/005* (2013.01);
    (Continued)

(58) Field of Classification Search
    CPC . B25J 13/08; B25J 9/1697; B64F 5/10; G01B 11/03; G01B 11/26; B23P 19/10; B23P 2700/01
    (Continued)

(56) References Cited

U.S. PATENT DOCUMENTS 5,380,978 A    1/1995    Pryor
6,662,103 B1   12/2003   Skolnick
(Continued)

FOREIGN PATENT DOCUMENTS

| CN | 103979118 A | 8/2014 | |
| WO | 2012027541 A1 | 3/2012 | |
| WO | WO-2015141178 A1 * | 9/2015 | ............ B25J 9/1697 |

OTHER PUBLICATIONS

European Application Serial No. 17152831.8, Office Action dated Apr. 8, 2021, 5 pgs.

(Continued)

*Primary Examiner* — Dalena Tran
(74) *Attorney, Agent, or Firm* — Kwan & Olynick LLP

(57) ABSTRACT

Provided are methods and systems for aligning multiple parts using simultaneous scanning of features of different parts and using feature-based coordinate systems for determining relative positions of these. Specifically, a feature-based coordinate system may be constructed using one or more critical dimensions between features of different parts. The scanner may be specifically positioned to capture each of these critical dimensions precisely. The feature-based coordinate system is used to compare the critical dimensions to specified ranges. The position of at least one part may be adjusted based on results of this comparison using, for example, a robotic manipulator. The process may be repeated until all critical dimensions are within their specified ranges. In some embodiments, multiple sets of features from different parts are used such that each set uses its own feature-based coordinate system. The part adjustment may be performed based on the collective output from these multiple sets.

20 Claims, 7 Drawing Sheets

(51) Int. Cl.
  *B23K 37/04* (2006.01)
  *B25J 9/16* (2006.01)
  *B25J 13/08* (2006.01)
  *G01B 11/03* (2006.01)
  *G01B 11/26* (2006.01)
  *B64F 5/10* (2017.01)

(52) U.S. Cl.
  CPC ............ *B25J 9/1697* (2013.01); *B25J 13/08* (2013.01); *B64F 5/10* (2017.01); *G01B 11/03* (2013.01); *G01B 11/26* (2013.01); *B23P 2700/01* (2013.01)

(58) Field of Classification Search
  USPC .............................. 414/751.1, 800; 198/375
  See application file for complete search history.

(56) References Cited

U.S. PATENT DOCUMENTS

| | | | |
|---|---|---|---|
| 8,203,576 | B2 | 6/2012 | Chang et al. |
| 8,256,480 | B1 | 9/2012 | Weber et al. |
| 8,265,376 | B2 | 9/2012 | Tsuk et al. |
| 8,346,392 | B2 | 1/2013 | Walser et al. |
| 9,389,084 | B1* | 7/2016 | Chen ..................... G01C 11/06 |
| 10,556,305 | B2 | 2/2020 | Lee et al. |
| 2009/0287427 | A1 | 11/2009 | Dubois et al. |
| 2012/0027541 | A1 | 3/2012 | Gerber et al. |
| 2012/0167386 | A1 | 12/2012 | Goergen et al. |
| 2014/0081459 | A1 | 3/2014 | Dubois et al. |
| 2014/0253720 | A1* | 9/2014 | Li ......................... B25J 9/1697 348/95 |
| 2014/0365061 | A1 | 12/2014 | Vasquez et al. |
| 2014/0372116 | A1* | 12/2014 | Smith ................... B25J 13/003 704/235 |
| 2015/0070468 | A1 | 3/2015 | Pfeffer |
| 2015/0160343 | A1 | 6/2015 | Zweigle et al. |
| 2016/0279791 | A1* | 9/2016 | Watanabe .............. G06V 20/64 |
| 2017/0066133 | A1* | 3/2017 | Ooba .................. G05B 19/4182 |
| 2017/0216981 | A1 | 8/2017 | Lee et al. |

OTHER PUBLICATIONS

U.S. Appl. No. 15/014,740, Notice of Allowance and Fees Due (Ptol-85), dated Jan. 14, 2020, 3 pgs.
U.S. Appl. No. 15/014,740, Examiner Interview Summary dated Jun. 3, 2019, 3 pgs.
U.S. Appl. No. 15/014,740, Examiner Interview Summary dated Jun. 4, 2018, 3 pgs.
U.S. Appl. No. 15/014,740, Examiner Interview Summary dated Nov. 26, 2018, 3 pgs.
U.S. Appl. No. 15/014,740, Final Office Action dated Sep. 20, 2018, 18 pgs.
U.S. Appl. No. 15/014,740, Non Final Office Action dated Jan. 30, 2019, 13 pgs.
U.S. Appl. No. 15/014,740, Non Final Office Action dated Apr. 19, 2018, 13 pgs.
U.S. Appl. No. 15/014,740, Notice of Allowance dated Aug. 28, 2019, 8 pgs.
U.S. Appl. No. 15/014,740, Supplemental Notice of Allowance dated Jan. 14, 2020, 4 pgs.
Aritex.
ATOS Plus—Automated Photogrammetry for ATOS, 2 pgs.
ATOS ScanBox—Optical 3D Measuring Machine, 4 pgs.
European Application Serial No. 17152831.8, Search Report dated Jun. 14, 2017, 7 pgs.
WLS400A, Hexagon Manufacturing Intelligence, 2 pgs.

* cited by examiner

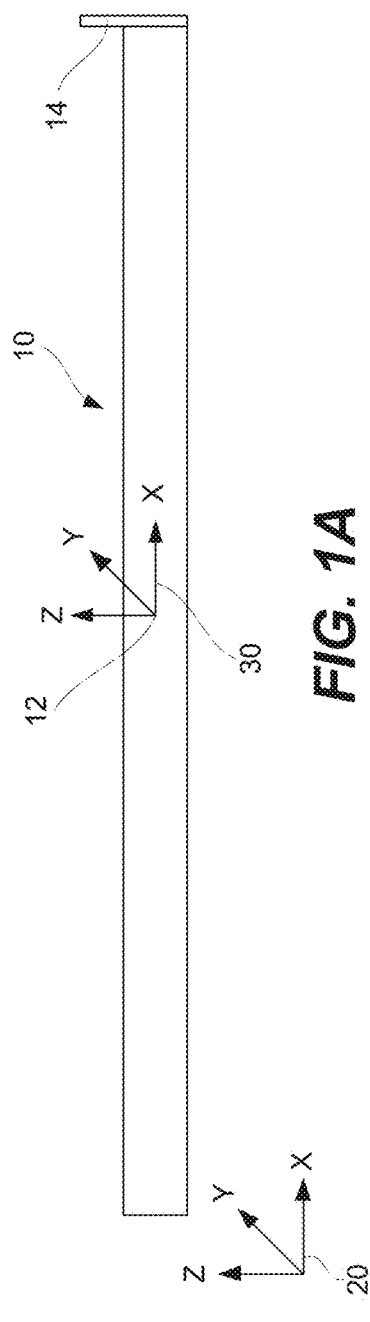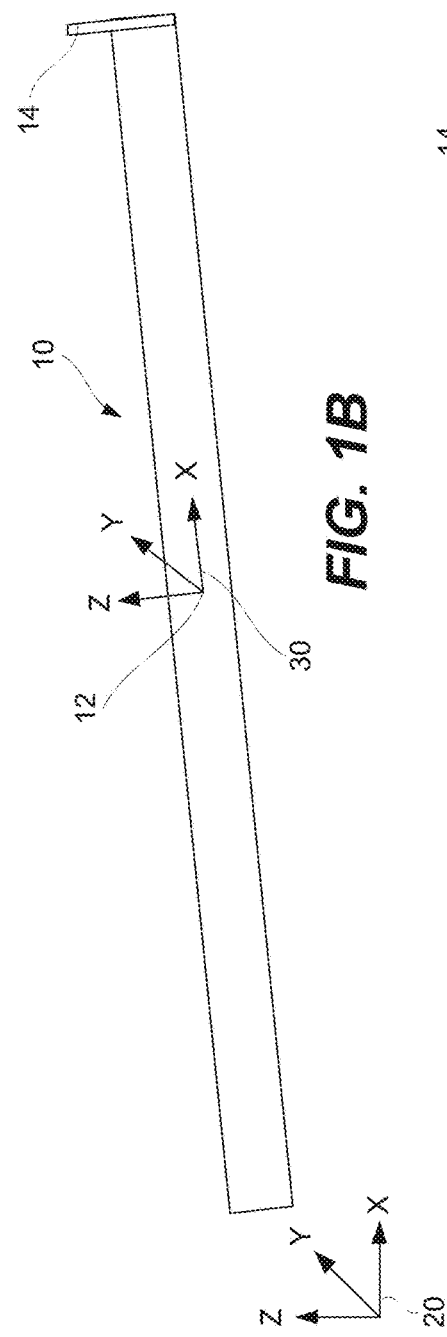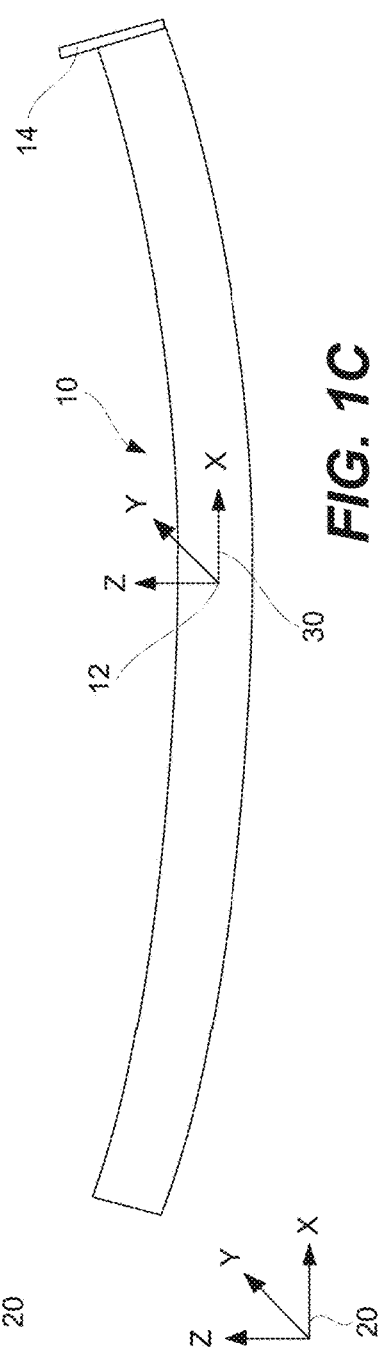

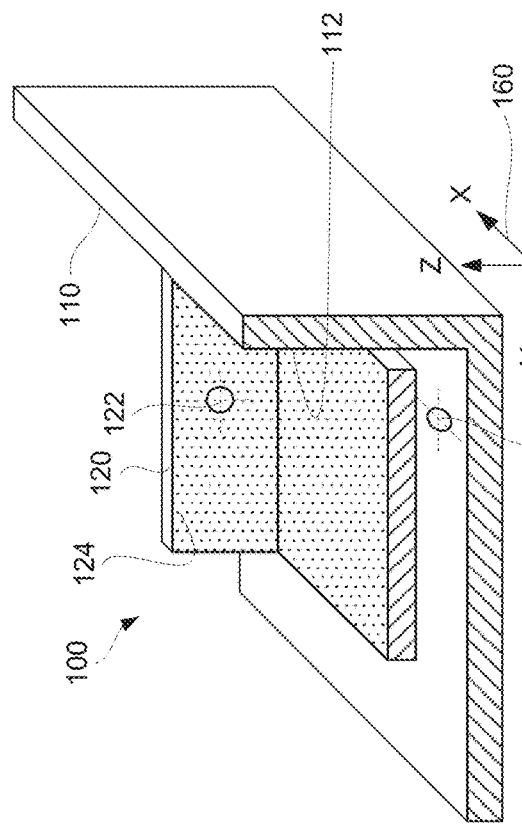
FIG. 3A
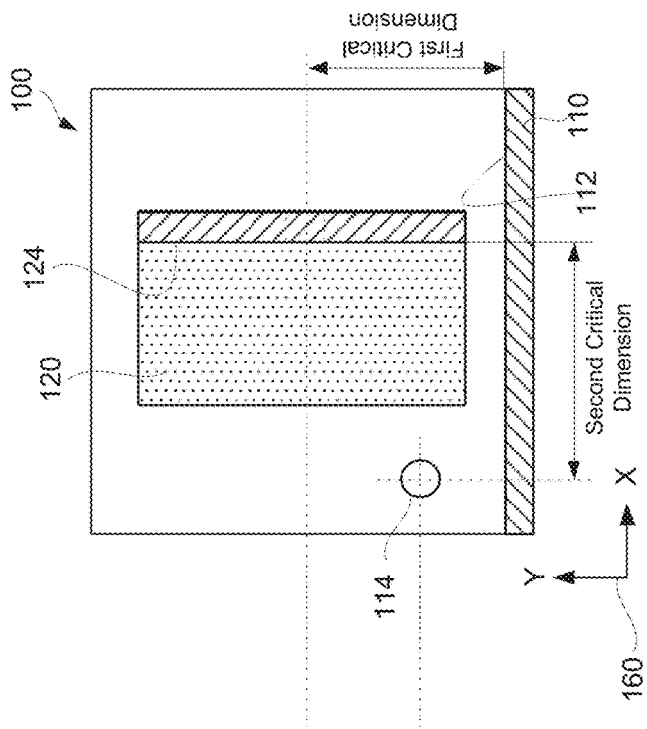
FIG. 3B
FIG. 3C

ALIGNING PARTS USING MULTI-PART SCANNING AND FEATURE BASED COORDINATE SYSTEMS

CROSS-REFERENCE TO RELATED APPLICATION

This application is a continuation of U.S. patent application Ser. No. 15/014,740, entitled "ALIGNING PARTS USING MULTI-PART SCANNING AND FEATURE BASED COORDINATE SYSTEMS," filed on 3 Feb. 2016, which is incorporated herein by reference in its entirety for all purposes.

BACKGROUND

Dimensional requirements for many applications, such as aerospace and aircraft applications, often demand tight assembly tolerances over large working envelopes. Currently, manual assembly using large scale fixtures or assembly jigs are used for controlling these dimensional requirements. However, these fixtures and jigs have various potential limitations, such as being expensive, difficult to install, requiring more facility modification, being less flexible to different part configurations or design changes, and being less flexible to future factory modification or production process changes. Another current approach is based on automated assembly systems using high accuracy machines. However, these machines may be expensive, tend to be very specialized and/or mechanically complex, require facility modification, may have high maintenance and service cost, may be sensitive to environmental changes, and may not always be able to meet engineering requirements. Yet another current approach requires prefabricated assembly features, such as determinant assembly holes. Forming these holes require additional processing, such as expensive computer numerical control (CNC) machines. In some cases, forming determinant assembly holes may not be possible because of certain structural or other requirements.

SUMMARY

Provided are methods and systems for aligning multiple parts using simultaneous scanning of features of different parts and using feature-based coordinate systems for determining relative positions of these. Specifically, a feature-based coordinate system may be constructed using one or more critical dimensions between features of different parts. The scanner may be specifically positioned to capture each of these critical dimensions precisely. The feature-based coordinate system is used to compare the critical dimensions to specified ranges. The position of at least one part may be adjusted based on results of this comparison using, for example, a robotic manipulator. The process may be repeated until all critical dimensions are within their specified ranges. In some embodiments, multiple sets of features from different parts are used such that each set uses its own feature-based coordinate system. The part adjustment may be performed based on the collective output from these multiple sets.

In some embodiments, a method of aligning a first part relative to a second part comprises selecting a first feature of the first part and a second feature of the second part. The method also comprises constructing a feature-based coordinate system based on one or more specified dimensions between the first feature and the second feature. The method also comprises positioning the first part relative to the second part such that the first feature of the first part and the second feature of the second part are within a field of view of a scanner. The method comprises determining position of the first feature relative to the second feature using the scanner, such as by simultaneously scanning the first feature and the second feature. The method also comprises comparing the position of the first feature relative to the second feature in the feature-based coordinate system based on the one or more specified dimensions between the first feature and the second feature. If any one of the one or more specified dimensions between the first feature and the second feature in the feature-based coordinate system is outside of their corresponding ranges, then the method comprises adjusting position of the first part relative to the second part to bring these one or more outside dimensions into their corresponding ranges.

In some embodiments, the first feature of the first part and the second feature of the second part are selected based on expected orientation of the first feature and the second feature. Another factor for selecting the first feature and the second feature may be simultaneous detectability of the first feature and the second feature using the scanner. For example, the features are selected such that both features are simultaneously within the line of sight as well as within the field of view of the scanner. Some examples of the features include, but are not limited to, an edge, a plane, and a contoured feature. In some embodiments, at least one of the first feature and the second feature is a geometrically constructed feature based on one or more of physical features. For example, a geometrically constructed feature may be the center of an opening where the edges of an opening are used to identify the center. A geometrically constructed feature may be also referred to as a derived feature to differentiate them from actual physical features, such as a surface, edge, corner, and the like.

In some embodiments, the feature-based coordinate system is further constructed based on expected orientation of the first feature and the second feature, in addition to the one or more specified dimensions between the first feature and the second feature. For example, the expected location of the first feature may be selected as a center/datum of the feature-based coordinate system and the direction of at least one of the one or more specified dimensions (or at least the direction of this dimension) may be used as one axis of this feature-based coordinate system. The actual position of the first feature relative to the second feature determined during the scanning is then identified in this feature-based coordinate system.

In some embodiments, positioning the first part relative to the second part is performed based on referencing a part-based coordinate system of the first part to a part-based coordinate system of the second part. For example, the part-based coordinate system of the first part may be associated with the overall length, height, and width of the first part. The part-based coordinate system of the first part may be used to identify the location of the first feature if the first part is not deformed relative to its nominal shape. However, at least one of the first part or the second part may be deformed relative to its nominal shape after positioning the first part relative to the second part and their respective part-based coordinate systems may not be capable of precisely aligning the two parts or, more specifically, the first feature of the first part relative to the second feature of the second part.

In some embodiments, positioning the first part relative to the second part may be performed using a robotic manipulator. The scanner may be a three dimensional (3D) photogrammetry scanner. In some embodiments, the position of the first feature relative to the second feature determined by the scanner is at least 5-axis error measurement of the first feature relative to the second feature in the feature-based coordinate system or, more specifically, is 6-axis error measurement of the first feature relative to the second feature.

In some embodiments, the method also comprises determining the position of a third feature of the first part relative to a fourth feature of the second part using the scanner. The third feature is different from the first feature. Likewise, the fourth feature is different from the second feature. The method then proceeds with comparing the position of the third feature relative to the fourth feature based on the one or more specified dimensions between the third feature and the fourth feature. If any one of the one or more specified dimensions between the third feature and the fourth feature is outside of their corresponding ranges, then the method proceeds with adjusting position of the first part relative to the second part to bring these out-of-range dimensions between the third feature and the fourth feature into their corresponding ranges.

Comparing the position of the third feature relative to the fourth feature may be performed using the feature-based coordinate system constructed based on the one or more specified dimensions between the first feature and the second feature. Alternatively, comparing the position of the third feature relative to the fourth feature is performed using an additional feature-based coordinate system constructed based on the one or more specified dimensions between the third feature and the fourth feature. In other words, a new feature-based coordinate system may be used for each new pair of features or, more generally, for each new set of features such that at least one or more features in the set are on the first part and at least one or more other features in the same set are on the second part.

In some embodiments, adjusting position of the first part relative to the second part to bring the any one of the one out-of-the range dimensions between the first feature and the second feature and between the third feature and the fourth feature into their corresponding ranges is performed simultaneously. In other words, the collective comparison of the position of the first feature relative to the second feature and of the position of the third feature relative to the fourth feature may be used for determining how the position of the first part needs to be adjusted.

Alternatively, adjusting position the first part relative to second part to bring the out-of-the-range dimensions between the third feature and the fourth feature into their corresponding ranges is performed after adjusting position the first part relative to second part to bring the out-of-the-range dimensions between the first feature and the second feature into the corresponding range. In other words, the adjustment of each pair of features or, more generally, each set of features is performed independently. In these embodiments, the method may further comprise toggling between comparisons of each pair of features or, more generally, of each set of features and performing corresponding adjustments. Specifically, after adjusting position the first part relative to second part to bring the any one of the out-of-the-range dimensions between the third feature and the fourth feature into their corresponding ranges, the following operations may be repeated (a) determining position of the first feature relative to the second feature; (b) comparing the position of the first feature relative to the second feature; and (c) if any one of the one or more specified dimensions between the first feature and the second feature in the feature-based coordinate system is outside of their corresponding ranges, then adjusting position of the first part relative to the second part to bring these out-of-the-range dimensions into the corresponding ranges.

In some embodiments, the first feature, the second feature, the third feature, and the fourth feature are simultaneously within the field of view of the scanner. In these embodiments, comparing the position of the first feature relative to the second feature may also involve comparing position of the first feature to the fourth feature and/or comparing position of the third feature to the second feature.

In some embodiments, the method also involves changing position of the scanner after determining position of the first feature relative to the second feature and prior to determining position of the third feature relative to the fourth feature. In other words, the scanner may be repositioned for scanning each pair of features or, more generally, each set of features. This approach may be used to ensure the most accurate determination of feature positions since the position of the scanner is individually set for each pair of features or, more generally, each set of features thereby allowing the most precise scanning of this pair or set.

In some embodiments, the method further comprises repeating some operations until all of the one or more specified dimensions are within their corresponding ranges. The repeated operations may include (a) determining position of the first feature relative to the second feature; (b) comparing the position of the first feature relative to the second feature; and (c) if any one of the one or more specified dimensions between the first feature and the second feature in the feature-based coordinate system is outside of their corresponding ranges, then adjusting position the first part relative to the second part to bring these out-of-the-range dimensions into their corresponding range.

In some embodiments, the method further comprises joining the first part and the second part. This joining may be performed after adjusting the position of the first part feature relative to the second part.

The first part and the second part may be aircraft components in particular large aircraft components such as fuselage components, wing components, and the like.

Also provided is a method of joining a first part and a second part. The method may comprise determining position of a first feature of a first part relative to a second feature of a second part using a scanner by simultaneously scanning the first feature and the second feature. Some examples of this operation are described above. The method then proceeds with comparing the position of the first feature relative to the second feature in a feature-based coordinate system based on one or more specified dimensions between the first feature and the second feature within the feature-based coordinate system. If any one of the one or more specified dimensions between the first feature and the second feature in the feature-based coordinate system is outside of their corresponding ranges, then the method proceeds with adjusting position of the first part relative to the second part to bring the out-of-range dimensions into their corresponding ranges. The method also proceeds with joining the first part and the second part. Some examples of joining techniques include, but are not limited to, welding, soldering, crimping, bolting, and adhering. While joining the first part and the second part some operations of the method may be repeated, determining position of the first feature relative to the second feature; comparing the position of the first feature relative to the second feature; and if any one of the one or more specified dimensions between the first feature and the second feature in the feature-based coordinate system is outside of a corresponding range, adjusting position the first part relative to the second part to bring the any one of the one or more specified dimensions between the first feature and the second feature in the feature-based coordinate system into the corresponding range.

These and other embodiments are described further below with reference to the figures.

BRIEF DESCRIPTION OF THE DRAWINGS

FIGS. 1A-1C provide schematic illustration of a part at different states during handling of the part, in accordance with some embodiments.

FIGS. 3A-3C are schematic illustrations of two parts showing critical dimensions between features of these parts, in accordance with some embodiments.

DETAILED DESCRIPTION

Figure 2:
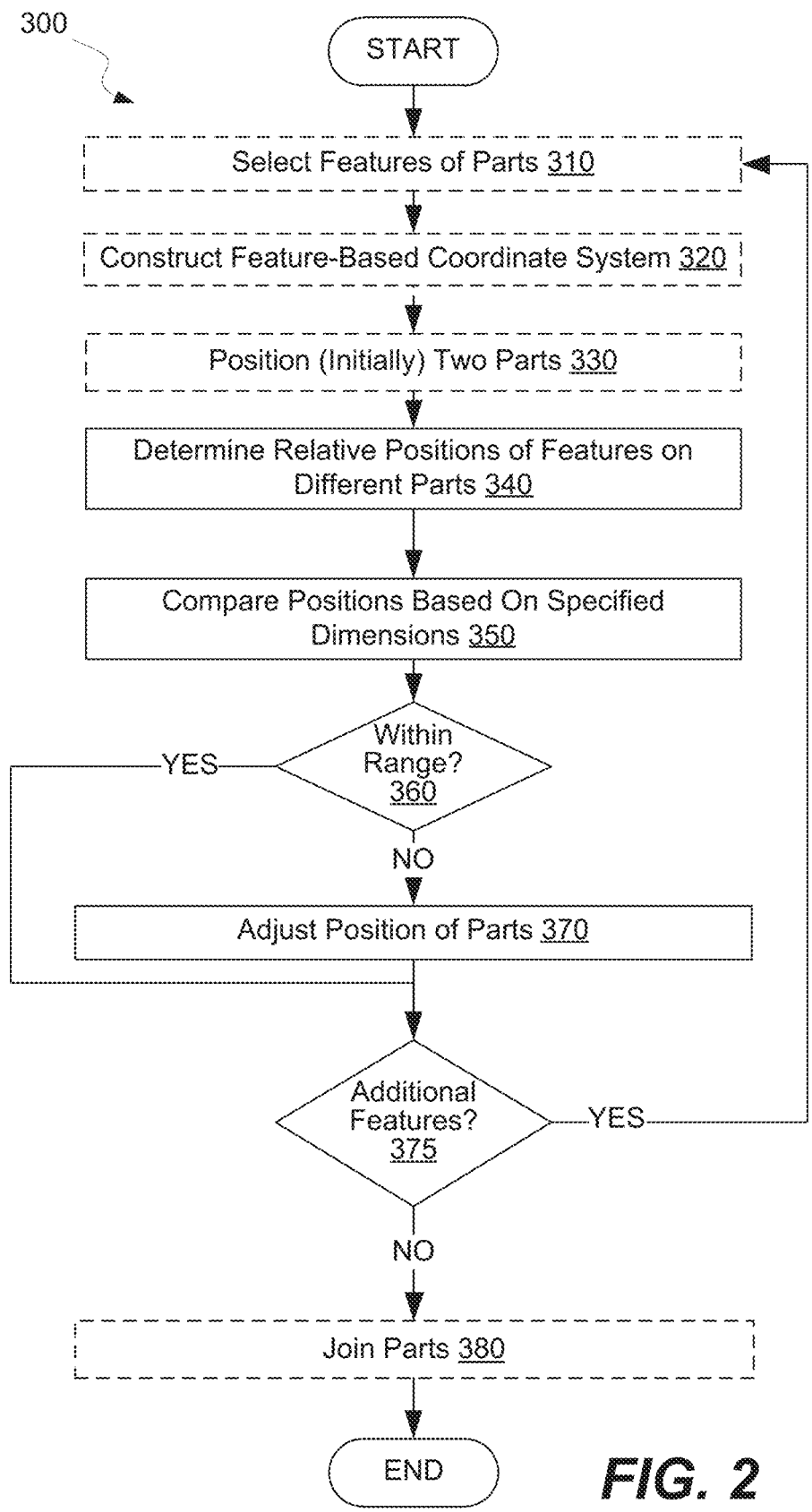
FIG. 2 is a process flowchart corresponding to a method of aligning a first part relative to a second part using multi-part scanning as well as a method of joining the part, in accordance with some embodiments.

In the following description, numerous specific details are set forth in order to provide a thorough understanding of the presented concepts. The presented concepts may be practiced without some or all of these specific details. In other instances, well known process operations have not been described in detail so as to not unnecessarily obscure the described concepts. While some concepts will be described in conjunction with the specific embodiments, it will be understood that these embodiments are not intended to be limiting.

Introduction

Tight dimensional tolerances for many applications, in particular applications involving large and/or flexible parts, present many challenges with aligning the parts. Some of these challenges cannot be addressed with current approaches at least in a useful and cost effective manner as described above. One of the alignment challenges comes from parts being bendable or flexible as well as from the difficulty of handling large parts. Such parts are common in aerospace, aircraft, and other such applications as further described below with reference to FIGS. 6 and 7. These challenges will now be described in more detail. FIGS. 1A-1C provide schematic illustrations of part 10 at different states during handling of part 10, in accordance with some embodiments. Specifically, FIG. 1A illustrates part 10 in its reference state when part coordinate system 30 is aligned with global coordinate system 20. In this example, each direction of part coordinate system 30 is parallel to the corresponding direction of global coordinate system 20. For simplicity and illustration, part coordinate system 30 is located at center 12 or part 10. Part 10 maintains its shape in this reference state and, as such, part coordinate system 30 can be used to find location and orientation of feature 14 on part 10. Based on the reference between part coordinate system 30 and global coordinate system 20, the location and orientation of feature 14 can be also identified in global coordinate system 20. As such, global coordinate system 20 may be used for aligning feature 14 relative to any other feature or component similarly identified in global coordinate system 20.

FIG. 1B illustrates part 10 in a tilted state. Part coordinate system 30 is not aligned with global coordinate system 20 in the same manner as in FIG. 1A described above. However, part coordinate system 30 can be still referenced using global coordinate system 20, e.g., using a tilt angle around or about the Y axis. Part 10 continues to maintain its shape in this tilted state and, as such, part coordinate system 30 can be used to find location and orientation of feature 14 on part 10. Similar to the state shown in FIG. 1A, the reference between part coordinate system 30 and global coordinate system 20 may be applied to identify the location and orientation of feature 14 in global coordinate system 20. As such, global coordinate system 20 may still be used for aligning feature 14 relative to any other feature or component similarly identified in global coordinate system 20.

FIG. 1C illustrates part 10 in a bent state. Part coordinate system 30 is aligned with global coordinate system 20 in a manner similar to the example presented in FIG. 1A. However, part 10 has a different shape in comparison to its reference state. As such, even the part coordinate system 30 cannot be used to find the location and orientation of feature 14 on part 10. In this state, both part coordinate system 30 and global coordinate system 20 are effectively useless for aligning feature 14 relative to any other feature in general or, more specifically, to a feature identified in global coordinate system 20. One having ordinary skill in the art would recognize that this bending as well as other types of part deformation often cannot be controlled without using very stiff, large, complex, and expensive fixtures. Controlling deformation of some large parts is simply not practical. As such, relying on the orientation of the part as a whole (e.g., based on its part coordinate system) may not be useful in some cases.

Methods and systems described herein provide for aligning multiple parts using simultaneous scanning of features of different parts and using feature-based coordinate systems rather than part-based coordinate systems or global coordinate system for aligning the parts or, more specifically, for aligning particular features of different parts. This alignment may be used for joining the part in the aligned state. This alignment effectively ignores the orientation of the part as a whole. As described above with reference to FIG. 3, bending or other types of part, deformation may interfere with the part-level orientation of the feature and the orientation of the part as a whole becomes irrelevant for precise orientation of features on different parts. The proposed methods and systems are based on the orientation of features of different parts relative to each other. This approach may be referred to as a local orientation or a feature based orientation. A feature-based coordinate system may be constructed for each set of features, which includes one or more features on each of the parts. This feature-based coordinate system may be independent from other coordinate system, e.g., part-based coordinate systems, global coordinate system, or even other feature-based coordinate systems used for the same alignment.

As noted above, a feature-based coordinate system may be constructed using one or more critical dimensions between features of different parts. The features and critical dimensions may be selected based on desired orientations of specific portions of parts containing these features, capabilities of the scanner, and other factors. Each pair or, more generally, each set of features may include one or more features on one part and one or more features on another part. One or more critical dimensions may be identified for each pair of features and used for alignment.

The scanner may be specifically positioned to capture each of these critical dimensions with a high precision. For example, the scanner may be positioned on a robotic arm and controlled based on the expected positions of the features and the critical dimension between these features. The orientation of the scanner may be changed when scanning different sets of features and/or identifying different critical dimensions.

The feature-based coordinate system is then used to compare the identified critical dimensions to their respective specified ranges. For example, each of the critical dimensions may have a target value associated, for example, with a computer aided design (CAD) model or a database and a corresponding tolerance identifying the range. In some embodiments, the feature-based coordinate system may be used to analyze the CAD model to determine the range, for example, from other dimensions and tolerances identified in the CAD model. Specifically, the range or even a nominal value for a critical dimension may not be specified in the CAD model directly. However, the model may be analyzed to determine this range from other available values identified in the CAD model.

The position of at least one part may be adjusted based on results of the comparison of the identified critical dimension to the range. Specifically, if the critical dimension is outside of its specified range, the adjustment may be performed. Each adjustment may be recorded to ensure that subsequent adjustment does not move the critical dimension outside of the range. For example, alignment of two parts may be performed based on two or more critical dimensions. Once the adjustment is performed to ensure that one of these critical dimensions is within the range, these adjustments may be accounted for while performing additional one or more adjustments to bring additional one or more critical dimensions to its range. This approach ensures that the first critical dimension is kept within the range while additional adjustments are performed. In some embodiments, a toggling between multiple critical dimensions is performed to ensure that performed adjustment leads to all critical dimensions being within their respective ranges. This may be referred to as a converging algorithm. The adjustment may be performed using, for example, a robotic manipulator or, more specifically, a robotic arm. A coordinate system of the robotic manipulator may be aligned with respect to the feature-based coordinate system to simplify the control of the robotic manipulator.

The relative position of two features may be determined based on one or more critical dimensions between these features. These dimensions may be distances, angles, or any other suitable dimensions. The features may be real features (e.g., edges, corners, surfaces, and the like) or derived features (e.g., centers of openings, mid-planes, and the like). Without being restricted to any particular theory, it is believed that using critical dimensions for individual pairs of features result in more accurate alignment (e.g., orientation determination) than, for example, when global orientations are used for parts as described above with reference to FIGS. 1A-1C. For example, in order to simultaneously and directly calculate the relative position of critical features, a 3D scanner may be used to collect point cloud data for these critical feature and, in some embodiments, other features of two different parts. This point cloud data may include a variety of individual measurements for different feature pairs. The point cloud data may be then evaluated to determine the relative orientation of the critical features and this information may be then used for correcting part positions, e.g., controlling a robot manipulator.

Examples of Methods Used for Aligning Parts

FIG. 2 is a process flowchart corresponding to method 300 of aligning first part 110 relative to second part 120, in accordance with some embodiments. Two examples of first part 110 and second part 120 are shown in FIGS. 3A-3C and FIGS. 4A-4B and described below with reference to this figures. One having ordinary skill in the art would understand that other part examples are also within the scope.

Method 300 may comprise selecting first feature 112 of first part 110 and second feature 122 of second part 120 during optional operation 310. These selected features may be real features (e.g., edges, corners, surfaces) or derived features (e.g., centers of openings, mid-planes). The selected features may belong to parts being oriented with respect to each other, which may be referred to as direct referencing. In some embodiments, features of other reference parts (e.g., supporting fixtures) may be used for indirect referencing. For example, first feature 112 of first part 110 may be compared to a feature of a reference part, while second feature 122 of second part 120 may be compared to the same or another feature of the same reference part. These reference-part comparisons may be combined to determine relative orientation of first feature 112 to second feature 122 or, more generally, relative orientation of first part 110 to second part 120. The feature selection is based on detectability of features, orientation requirements, and/or other such factors.

FIGS. 3A-3C and FIGS. 4A-4B illustrate various examples of selected features. Specifically, FIGS. 3A-3C illustrates an example of assembly 100 including first part 110 and second part 120 such that both first part 110 and second part 120 have an L-shape profile. However, the L-shape profile of second part 120 is turned 90° counter clockwise relative the L-shape profile of first part 110. In this example, first feature 112 of first part 110 is the inner wall of one leg of the L-shape profile, while second feature 122 of second part 120 is a center of the whole in one leg of the L-shape profile. The features may be selected because of they can be easily detected and measured. Furthermore, these features may be selected because they can precisely identify the target orientation of first part 110 relative to second part 120 or, at least, portions of these parts containing the features. The feature selection operation in method 300 effectively removes (ignores) scanning data associated with unnecessary components in the tolerance chain. This aspect may be particularly important when, for example, there are multiple layers of parts in the same assembly (e.g., multiple sub-assemblies).

In some embodiments, additional features of first part 110 and second part 120 are also identified during operation 310. For example, FIGS. 3A-3C also illustrate third feature 114 of first part 110 and fourth feature 124 of second part 120. In this example, third feature 114 is the center of an opening positioned on a different leg of the L-shape than first feature 110. Fourth feature 124 is the inner wall of the same leg of the L-shape containing second feature 122. The first critical dimension is identified as a dimension between first feature 112 and second feature 122 and extending along the Y axis. The second critical dimension is identified as a dimension between third feature 114 and fourth feature 124 and extending along the X axis. These axes may be parts of feature-based coordinate system 160.

As further described below, feature-based coordinate system 160 may be constructed based on one or more specified dimensions between first feature 112 and second feature 122, such as the first critical dimension shown in FIGS. 3A-3B. Without being restricted to any particular theory, it is believed that for many complex geometries, such as the ones shown in FIGS. 3A-3B, using one or more pairs of features and critical dimensions between these features is more accurate that trying to define global coordinate systems for both parts and determine their relative orientations based on these global coordinate systems. The dimensions identified between each pair of features may be a distance, angle, or some other dimension. The feature pairs and dimensions may be determined based on particular process requirements. For example, a dimensional tolerance in one direction may be different than that in other direction.

Figure 4A:
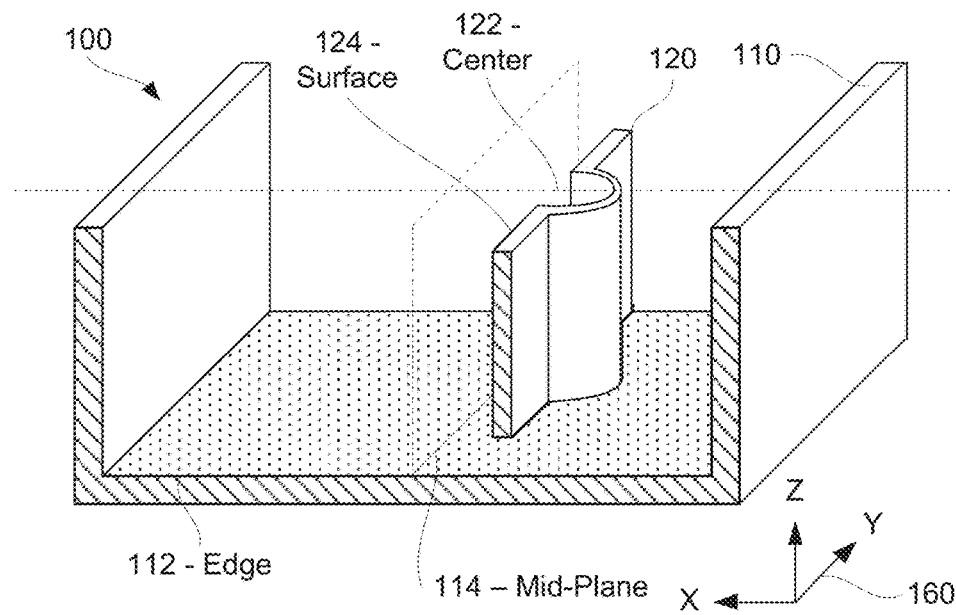
FIGS. 4A and 4B are schematic illustrations of another example of two parts showing critical dimensions between features of these parts, in accordance with some embodiments.
Figure 4B:
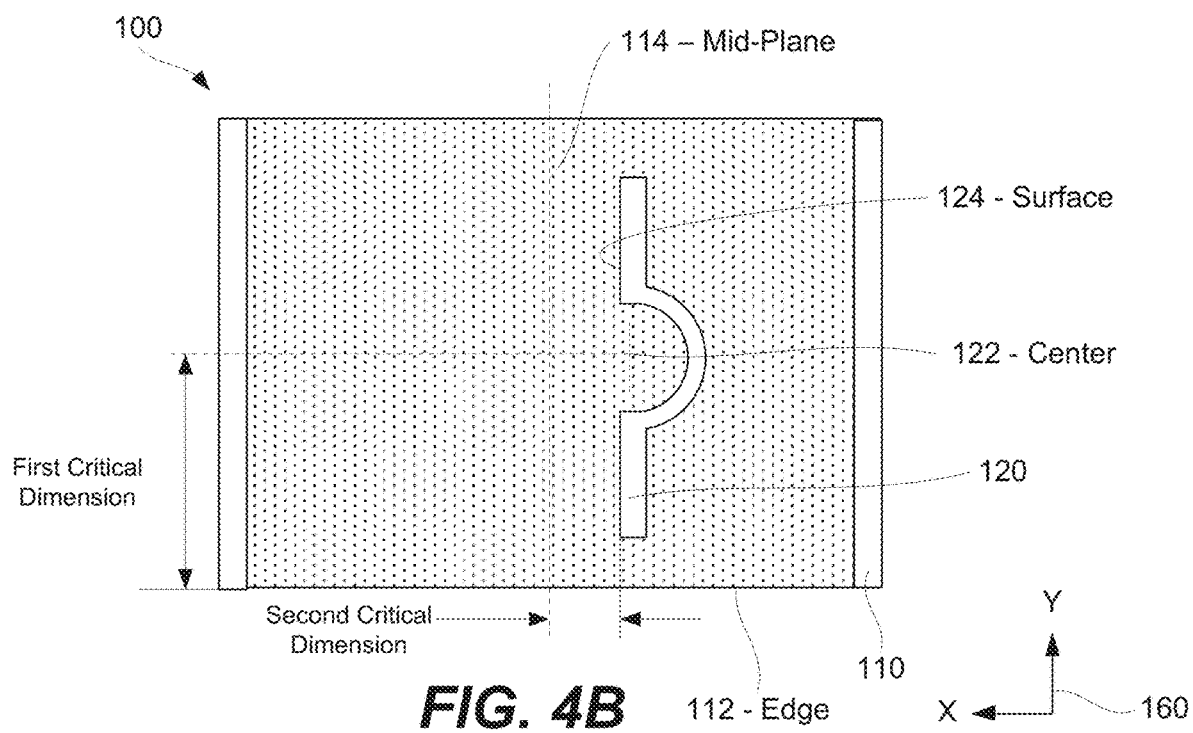

FIGS. 4A-4B illustrate another example of assembly 100 including first part 110 and second part 120. First part 110 has a square U-channel shape, while second part 120 has a straight shape with a semicircular portion. Second part 120 is positioned within the channel of first part 110. First feature 112 is an edge (the front edge) of first part 110, while second feature 122 of second part 120 is a center of the semicircular portion disposed between two straight portions. The distance between this edge and the center is identified as a first critical dimension.

Third feature 114 is a mid-plane between two vertical end portions of first part 110, while fourth feature 124 is a front surface of second part 120. This front surface is formed by the two straight portions positioned on different parts of the semicircular portions of second part 120. The distance between these edge and the front surface is identified as a second critical dimension.

It should be noted that first feature 112 and fourth feature 124 are actual physical features, while second feature 122 and third feature 114 are derived features. In order to identify each derived feature one or more physical features may be used. Specifically, the one or more physical features associated with the derived feature are identified (e.g., an edge of the circular opening may be used to identify the center of the opening). This physical feature identification is then used to construct and position the derived feature.

One having ordinary skill in the art would recognize that other examples of orienting multiple parts is also within the scope of this disclosure. In some embodiments, additional reference parts or, more specifically, features of the reference parts may be used to orient two or more target parts. For example, a supporting fixture may be used as a reference part during orientation of two target parts that are supported by this fixture. The orientation of the reference part is only relevant for determining orientation of the target parts but not otherwise. One or more reference parts may be used, for example, when features in these parts are easily measureable.

For example, a 3D photogrammetry scanner may be used to analyze the fixture supporting a first part. The fixture may have reference features, such as easily identifiable high-contrast stickers. The limited and controlled utilization of the fixture allows using various types of reference features that may not be applicable on actual parts. Furthermore, relative orientations of these reference features may be established during calibration of the fixture, e.g., prior to execution of method 300. Once the parts are positioned on the fixture, the 3D photogrammetry scanner may be utilized to scan different features on these parts and determine positions of different sets of features on the parts and on the fixture.

Figure 5:
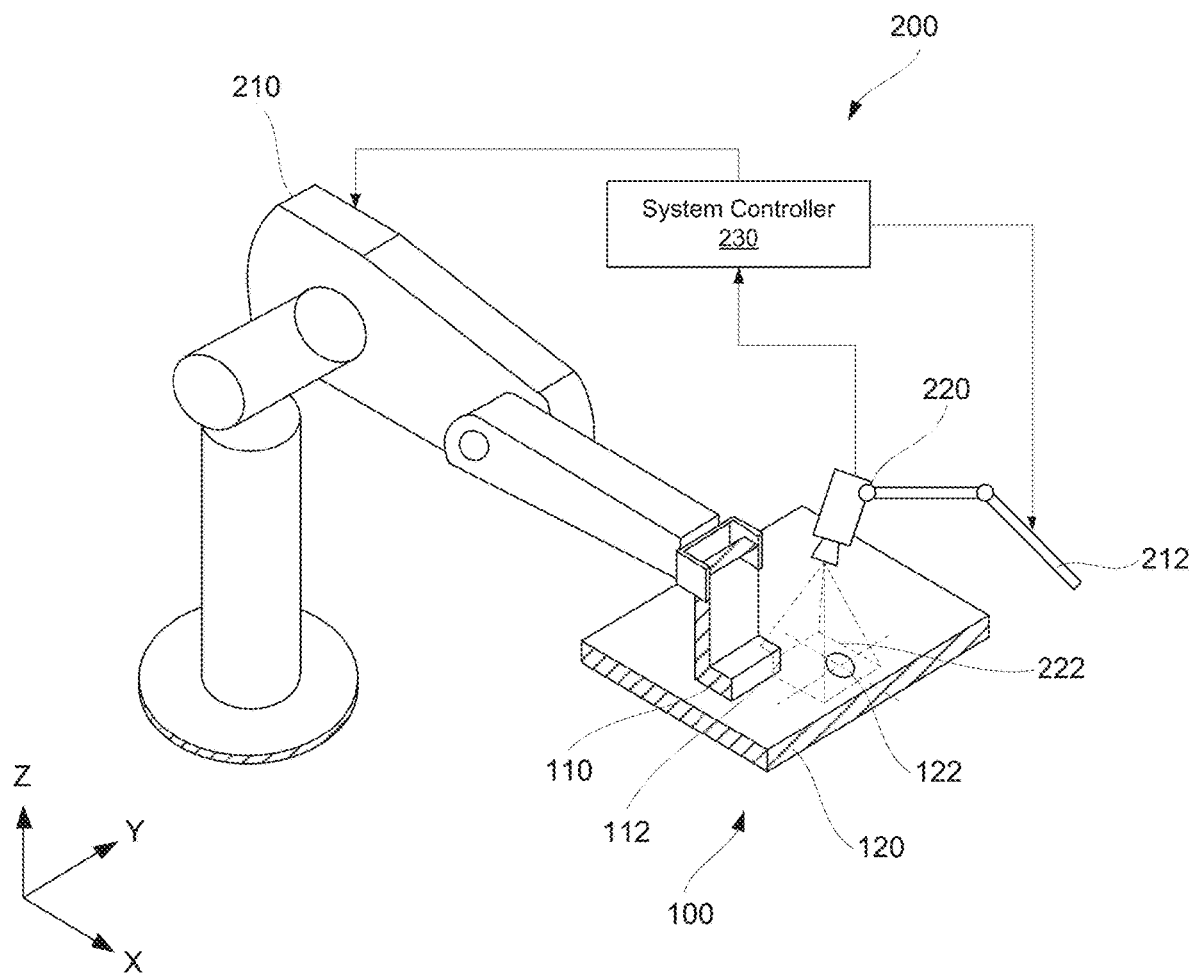
FIG. 5 is a schematic illustration of a system used for inspection alignment of two parts using multi-part scanning and for aligning the two parts, in accordance with some embodiments.

In some embodiments, first feature 112 of first part 110 and second feature 122 of second part 120 are selected based on expected orientation of first feature 112 and second feature 122. Another factor may be simultaneous detectability of first feature 112 and second feature 122 using scanner 220, which is illustrated in FIG. 5 and further described below with reference to this figure. For example, both features may need to be within the line of sight as well as within field of view 222 of scanner 220 as shown in FIG. 5. It should be noted that only a portion of first part 110 containing first feature 112 and a portion of second part 120 containing second feature 122 may be within field of view 222 of scanner 220. Other portions of first part 110 and second part 120 may be outside of field of view 222. Scanner 220 may be moved with respect to first part 110 and second part 120 to position different features of these parts within field of view 222.

Some examples of features include, but are not limited to, an edge, a plane, and a contoured feature as shown in FIGS. 3A-3C and FIGS. 4A-4B. In some embodiments, some features may be geometrically constructed features, such as second feature 122 and third feature 114 in the examples shown in FIG. 3A-3C or fourth feature 124 in the example shown in FIG. 4A-4B. The geometrically constructed features are based on one or more of physical features and may also be referred to as derived features.

It should be noted that in some embodiments operation 310 may not be performed. In these embodiments, the features may be previously selected and recorded, for example, in a CAD model or in a database.

Returning to FIG. 2, method 300 also comprises constructing feature-based coordinate system 160 during optional operation 320. Unlike global part coordinate systems described above, feature-based coordinate system 160 may be constructed based on one or more specified dimensions between first feature 112 and second feature 122 as, for example, shown in FIG. 3A or FIG. 4A. Use of feature-based coordinate system 160 eliminates concerns with part deformation and allows for focus on the critical portions of the parts, such as the parts containing first feature 112 and second feature 122 in our example. Feature-based coordinate system 160 is also designed to simplify verification of the orientations as this system is constructed based on the critical dimensions and allows direct verifications of these dimensions without any concerns with intermediate references. Referring to FIG. 3A and FIG. 4A, feature-based coordinate system 160 may use axes extending parallel to the critical dimensions, such as the Y axis being parallel to the first critical dimensions and the X axis being parallel to the second critical dimension.

In some embodiments, feature-based coordinate system 160 is further constructed based on expected orientation of first feature 112 and second feature 122, in addition to one or more specified dimensions between first feature 112 and second feature 122. For example, the expected location of first feature 112 may be selected as a center/datum of feature-based coordinate system and direction of at least one of one or more specified dimensions may be used as one axis of this feature-based coordinate system. Actual position of first feature 112 relative to second feature 122 (determined during scanning) is identified in this feature-based coordinate system.

In some embodiments, operation 320 is not performed. In these embodiments, feature-based coordinate system 160 may be provided as a part of a CAD model or a database corresponding to part assembly 100 containing first part 110 and second part 120.

Returning to FIG. 2, method 300 also comprises positioning first part 110 relative to second part 120 during optional operation 330. This positioning may be referred to as initial positioning or rough positioning. Operation 330 may be performed based on the modeled shapes of first part 110 and second part 120 and desired orientation of first part 110 and second feature 122. Deformation of first part 110 and second part 120 and various aspects of supporting fixtures may be ignored. After completing operation 330, first feature 112 of first part 110 and second feature 122 of second part 120 may be within field of view 222 of scanner 220 as, for example, shown in FIG. 5.

In some embodiments, positioning first part 110 relative to second part 120 during operation 330 is performed based on referencing the part-based coordinate system of first part 110 to the part-based coordinate system of second part 120. For example, the part-based coordinate system of first part 110 may be associated with overall length, height, and width of first part 110. The part-based coordinate system of first part 110 may be used to identify location of first feature 112 if first part 110 is not deformed relative to its nominal shape. However, at least one of first part 110 or second part 120 may be deformed relative to its nominal shape after positioning first part 110 relative to second part 120. In some embodiments, positioning first part 110 relative to second part 120 during operation 330 may be performed using a robotic manipulator.

In some embodiments, operation 340 is not performed. For example, the initial position of first part 110 and second part 120 may be determined based on fixtures supporting these parts.

Returning to FIG. 2, method 300 comprises determining position of first feature 112 relative to second feature 122 during operation 340. This positioned may be determined using, for example, scanner 220. In some embodiments, scanner 220 simultaneously scans first feature 112 and second feature 122 during operation 340. As noted above and as illustrated in FIG. 5, first feature 112 and second feature 122 may be within field of view 222 of scanner 220 during this operation. Scanner 220 may be a three 3D photogrammetry scanner, 3D scanner, laser tracker, and various combinations thereof. For example, a 3D scanner may be used to capture multiple images of the inspection area and these images may be stitched together to get representation of the entire inspection area. In some embodiments, a laser tracker may be used to measure location of particular features (e.g., pins in the fixture) and these measured locations may be combined with one or more 3D scans during operation 340.

Both first feature 112 and second feature 122 are detected at the same time during this operation and their relative position can be identified directly or through other reference features (e.g., features on a supporting fixture as described above). The relative position of first feature 112 and second feature 122 may be identified using one or more coordinates (e.g., in feature-based coordinate system 160), one or more distances and corresponding angles relative to axes in feature-based coordinate system 160), and various combinations thereof. Different degrees of freedom may be used for defining the relative position, such as five degrees of freedom or six degrees of freedom. The relative position identified with five degrees of freedom may be referred to as 5-axis error measurement of first feature 112 relative to second feature 122. In a similar manner, the relative position identified with six degrees of freedom may be referred to as 6-axis error measurement.

In some embodiments, determining position of first feature 112 relative to second feature 122 involves capturing one or more images of first feature 112 and second feature 122 and using a computer system to calculate one or more point clouds for these features. The point clouds are sets of data points in feature-based coordinate system 160 representing first feature 112 and second feature 122. For example, multiple images may be stitched together or one or more point clouds may be identified for each image and then multiple point clouds may be reconciled into a single point cloud representing the relative position of first feature 112 and second feature 122. In some embodiments, a global point cloud may be used to combine multiple different local point clouds. The computer system then determines relative feature positions using these point clouds. It should be noted that the same point cloud can be used for determining orientations of different pairs of features. A point cloud may be specific to a part or a feature.

Referring to FIG. 2, method 300 also comprises comparing position of first feature 112 relative to second feature 122 during operation 350. This comparison may be performed in feature-based coordinate system 160 constructed previously. Furthermore, this comparison may be performed based on one or more specified dimensions between first feature 112 and second feature 122.

If any one of one or more specified dimensions between first feature 112 and second feature 122 in feature-based coordinate system 160 is outside of their corresponding ranges as reflected by decision block 360, then method 300 may proceed with adjusting position first part 110 relative to second part 120 during operation 370. This operation is performed to bring the specified dimensions between first feature 112 and second feature 122 in feature-based coordinate system within their corresponding range. Otherwise, operation 370 may be skipped.

In some embodiments, method 300 also comprises determining position of additional features and using this determination for comparison and performing additional position adjustments as reflected by decision block 375. For example, method 300 may involve determining position of third feature 114 of first part 110 relative to fourth feature 124 of second part 120 as, for example, shown in FIGS. 3A-3C and FIGS. 4A-4B. In some embodiments, one of the new features may belong to a part not previously considered. For example, a third part may be used as a reference when determining orientation of two other parts. The third part may be a fixture supporting one or both of the parts being oriented. While the orientation of the third part relative to either one of the two parts may not be critical, using the third part as a reference may be important when sonic feature of the two other parts can be easily referenced to each other due to various constraints.

One having ordinary skills in the art would understand that any number of feature pairs may be used for determining the relative orientation of first part 110 and second part 120 and adjusting their positions accordingly. In general, a larger number of feature pairs may result in more precise orientation of first part 110 and second part 120 and provide less degrees of freedom in this orientation. On the other hand, increasing the number of pairs may slow down the process. Specific process requirements may determine the number of feature pairs used in the alignment process. It should be noted that additional feature pairs may be used for verification purposes and not necessarily for actual adjustment during operation 370. Furthermore, in many cases, the orientation of first part 110 relative to second part 120 does not require to constrain all six degrees of freedom. This situation may be referred to partially constrained orientation. Additional constrains may come, for example, from fixtures supporting parts, design of parts, e.g., first part 110 contacting second part 120.

Method 300 may then proceed with comparing position of third feature 114 relative to fourth feature 124 based on one or more specified dimensions between third feature 114 and fourth feature 124. If any one of one or more specified dimensions between third feature 114 and fourth feature 124 is outside of a corresponding range, then method 300 proceeds with adjusting position first part 110 relative to second part 120 to bring any one of out-of-the-range dimensions to their corresponding ranges. In other words, third feature 114 and fourth feature 124 are treated as first features 112 and second feature 122 described above and operations 340-370 may be repeated for any number of feature pairs.

Comparing the position of third feature 114 relative to fourth feature 124 may be performed using the same feature-based coordinate system as used for comparing the position of first feature 112 relative to second feature 122. This feature-based coordinate system may be constructed based on one or more specified dimensions between first feature 112 and second feature 122. Alternatively, comparing position of third feature 114 relative to fourth feature 124 is performed using an additional feature-based coordinate system constructed based on one or more specified dimensions between third feature 114 and fourth feature 124. As such, a new feature-based coordinate system may be used for each new pair of features.

It should be noted that multiple sets of operations 310-370 (as defined by decision block 375) may be performed simultaneously. For example, a 3D scanner may collect data corresponding to all features of interest that are currently within the field of view of the scanner at the same time. These data may be then parsed based on the identified features.

In some embodiments, adjusting position first part 110 relative to second part 120 is performed simultaneously based on two considerations. The first consideration involves bringing any one of one or more specified dimensions between first feature 112 and second feature 122 into the corresponding range. The second consideration is to bring any one of one or more specified dimensions between third feature 114 and fourth feature 124 into range. In other words, two comparisons, such as the position of first feature 112 relative to second feature 122 and the position of third feature 114 relative to fourth feature 124, may be collectively used for determining how position of first part 110 needs to be adjusted. One having ordinary skills in the art would understand how this approach may be scaled to additional pairs of features. Different weights or factors may be assigned to adjustments driven by different pairs of features.

Alternatively, adjusting position first part 110 relative to second part 120 to bring any one of one or more specified dimensions between third feature 114 and fourth feature 124 to corresponding range is performed after adjusting position first part 110 relative to second part 120 to bring any one of one or more specified dimensions between first feature 112 and second feature 122 to corresponding range. In other words, adjustment of each pair of features is performed independently. In some embodiments, method 300 may further comprise toggling between comparisons of each pair of features and performing corresponding adjustments. Specifically, after adjusting position of first part 110 relative to second part 120 to bring any one of one or more specified dimensions between third feature 114 and fourth feature 124 to corresponding range, the following operations may be repeated: (a) determining position of first feature 112 relative to second feature 122; (b) comparing position of first feature 112 relative to second feature 122; and (c) if any one of one or more specified dimensions between first feature 112 and second feature 122 in feature-based coordinate system is outside of a corresponding range, then adjusting position first part 110 relative to second part 120 to bring the out-pf-the-range dimensions to their corresponding ranges.

In some embodiments, first feature 112, second feature 122, third feature 114, and fourth feature 124 are within field of view of scanner 220 simultaneously. In these embodiments, comparing position of first feature 112 relative to second feature 122 may also involve comparing position of first feature 112 to fourth feature 124 and/or comparing position of third feature 114 to second feature 122.

In some embodiments, method 300 also involves changing position of scanner 220 after determining position of first feature 112 relative to second feature 122 and prior to determining position of third feature 114 relative to fourth feature 124. In other words, scanner 220 may be repositioned for scanning each pair of features, for example, to ensure the most accurate determination of each pair of feature positions.

In some embodiments, method 300 further comprises repeating some operations until all of one or more specified dimensions are within corresponding ranges. The repeated operations may include: (a) determining position of first feature 112 relative to second feature 122; (b) comparing position of first feature 112 relative to second feature 122; and (c) if any one of one or more specified dimensions between first feature 112 and second feature 122 in feature-based coordinate system is outside of a corresponding range, the adjusting position first part 110 relative to second part 120 to bring the out-of-the-range dimensions to their corresponding ranges.

In some embodiments, method 300 further comprises joining first part 110 and second part 120 as reflected by optional operation 380. This joining may be performed after adjusting position of first part 110 feature relative to second part 120. When operation 380 is a part of method 300, this method may be referred to as a method of joining parts. It should be noted that the parts are joined after their respective portions containing critical features are alignment to the meet the desired criteria. Therefore, the method of aligning parts may be viewed as a subset of the method of joining parts. Operation 380 may be one of techniques selected from the group consisting of welding, soldering, crimping, bolting, and adhering.

While joining first part 110 and second part 120 during operation 380 some operations of method 300 may be repeated one or more times, such as operations 340-370 or some subset of these operations. More specifically, these operations may be repeated continuously while joining first part 110 and second part 120 during operation 380. The operations may be repeated up until adjusting position first part 110 relative to second part 120 is not possible anymore due to first part 110 and second part 120 being finally joined. One having ordinary skill in the art would understand that many joining operations, such as gluing, soldering, clamping, welding (at least initially, e.g., tack welding), allow for some adjustment of first part 110 relative to second part 120 while the parts are being joined, such as while glue is curing, solder is cooling, clamping pressure is still low, and the like. Repeating these operations ensures that alignment between first part 110 and second part 120 is maintained and that joining operation 380 does not disturb the alignment. In some cases, joining operations may disturb the initial alignment due to mechanical, thermal, and/or other forces applied to first part 110 and second part 120.

Specifically, the set of operations may include determining position of first feature 112 relative to second feature 122 during operation 340; comparing position of first feature 112 relative to second feature 122 during operation 350; and if any one of one or more specified dimensions between first feature 112 and second feature 122 in feature-based coordinate system is outside of a corresponding range (decision block 360), adjusting position first part 110 relative to second part 120 to bring any one of one or more specified dimensions between first feature 112 and second feature 122 in feature-based coordinate system to corresponding range (operation 370).

Examples of System for Aligning Parts

FIG. 5 is a schematic illustration of system 200 for aligning first part 110 relative to second part 120, in accordance with some embodiments. System 200 includes scanner 220 for determining position of features of different parts, such as first feature 112 of first part 110 and second feature 122 of second part 120 as shown in FIG. 5. In some embodiments, scanner 220 is a three-dimensional (3D) photogrammetry scanner. This type of scanner 220 utilizes high resolution cameras, which may take images of different parts. In some embodiments, reference parts, such as supporting fixtures, may be utilized in the overall alignment process. Furthermore, these supporting fixtures may be parts of system 200.

It should be noted that first feature 112 and second feature 122 are both within field of view 222 of scanner 220 at the same time while determining relative positions of the features as schematically shown in FIG. 5 and described above.

In some embodiments, scanner 220 is supported by robotic manipulator 212. One example of robotic manipulator 212 is a robotic arm. Robotic manipulator 212 may be used to ensure that scanner 220 is directed at first feature 112 and second feature 122 or, more specifically, that first feature 112 and second feature 122 are both within field of view 222 of scanner 220.

System 200 may also include system controller 230 for performing various operations described above. For example, system controller 230 may be used for constructing a feature-based coordinate system and comparing positions of the features. Specifically, system controller 230 may receive output from scanner 220 and use this output to perform various operations, such as controlling robotic manipulators 210 and 220.

System 200 may also include may also another robotic manipulator 210 for supporting one of the parts and used for adjusting position first part 110 relative to second part 120 as described above.

Examples of Aircraft and Methods of Fabricating and Operating Aircraft

Figure 6:
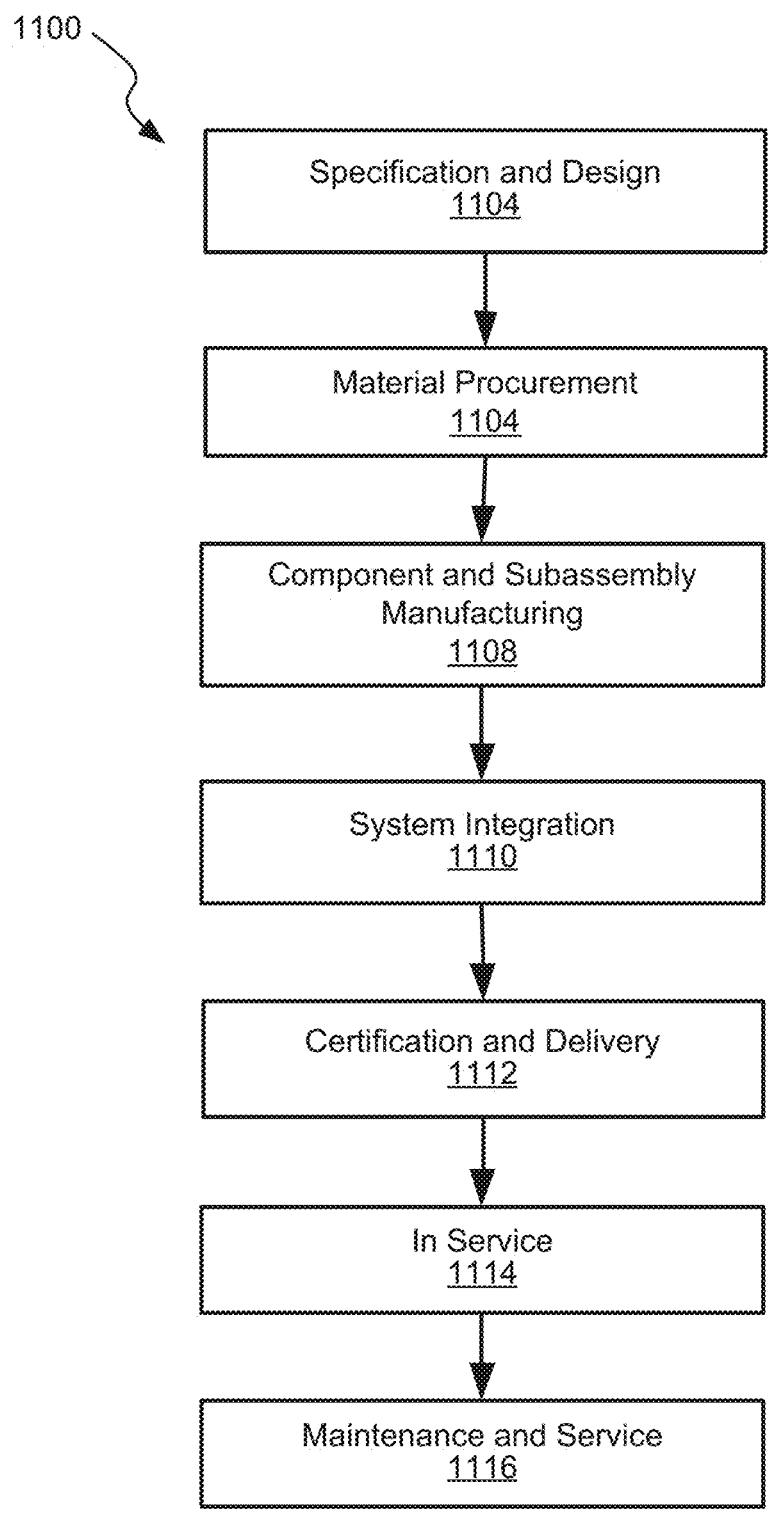
FIG. 6 is a block diagram of aircraft production and service methodology that may utilize methods and systems for aligning and joining multiple parts, as described herein.
Figure 7:
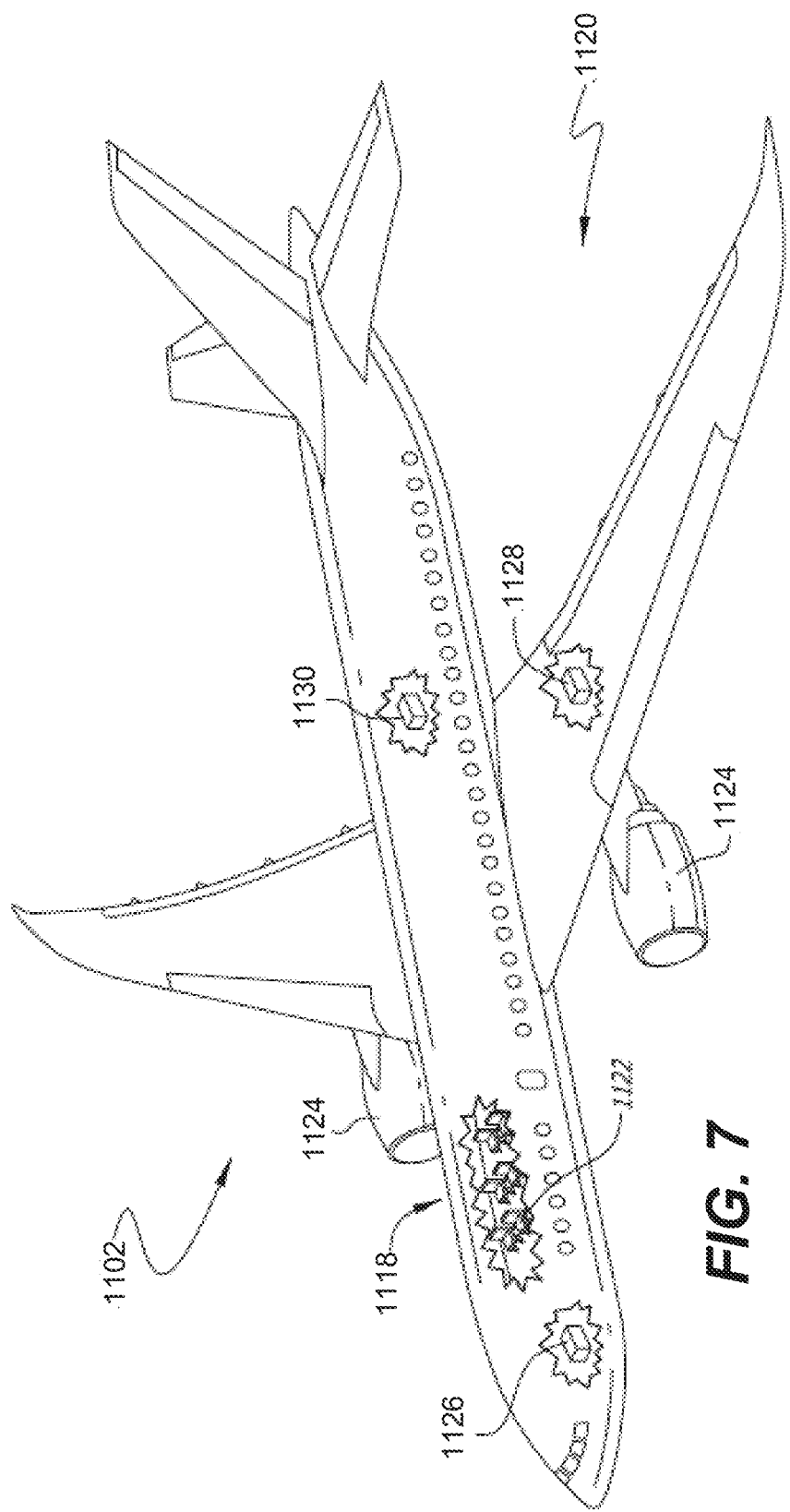
FIG. 7 is a schematic illustration of an aircraft that may in aligned and joined parts, as described herein.

Examples of the present disclosure may be described in the context of aircraft manufacturing and service method 1100 as shown in FIG. 6 and aircraft 1102 as shown in FIG. 7. During pre-production, illustrative method 1100 may include specification and design (block 1104) of aircraft 1102 and material procurement (block 1106). During production, component and subassembly manufacturing (block 1108) and inspection system integration (block 1110) of aircraft 1102 may take place. Methods and systems of aligning parts may be performed during any one of these operations.

Thereafter, aircraft 1102 may go through certification and delivery (block 1112) to be placed in service (block 1114). While in service, aircraft 1102 may be scheduled for routine maintenance and service (block 1116). Routine maintenance and service may include modification, reconfiguration, refurbishment, etc. of one or more inspection systems of aircraft 1102.

Each of the processes of illustrative method 1100 may be performed or carried out by inspection methods and systems described above used by integrator, a third party, and/or an operator (e.g., a customer). For the purposes of this description, an integrator may include, without limitation, any number of aircraft manufacturers and major-inspection system subcontractors; a third party may include, without limitation, any number of vendors, subcontractors, and suppliers; and an operator may be an airline, leasing company, military entity, service organization, and so on.

As shown in FIG. 7, aircraft 1102 produced by illustrative method 1100 may include airframe 1118 with a plurality of high-level inspection systems 1120 and interior 1122. Examples of high-level inspection systems 1120 include one or more of propulsion inspection system 1124, electrical inspection system 1126, hydraulic inspection system 1128, and environmental inspection system 1130. Any number of other inspection systems may be included. Although an aerospace example is shown, the principles disclosed herein may be applied to other industries, such as the automotive industry. Accordingly, in addition to aircraft 1102, the principles disclosed herein may apply to other vehicles, e.g., land vehicles, marine vehicles, space vehicles, etc.

Apparatus(es) and method(s) shown or described herein may be employed during any one or more of the stages of manufacturing and service method (illustrative method 1100). For example, components or subassemblies corresponding to component and subassembly manufacturing (block 1108) may be fabricated or manufactured in a manner similar to components or subassemblies produced while aircraft 1102 is in service (block 1114). Also, one or more examples of the apparatus(es), method(s), or combination thereof may be utilized during production stages (block 1108) and (block 1110), for example, by substantially expediting assembly of or reducing the cost of aircraft 1102. Similarly, one or more examples of the apparatus or method realizations, or a combination thereof, may be utilized, for example and without limitation, while aircraft 1102 is in service (block 1114) and/or during maintenance and service (block 1116).

Conclusion

Different examples of the apparatus(es) and method(s) disclosed herein include a variety of components, features, and functionalities. It should be understood that the various examples of the apparatus(es) and method(s) disclosed herein may include any of the components, features, and functionalities of any of the other examples of the apparatus(es) and method(s) disclosed herein in any combination, and all of such possibilities are intended to be within the spirit and scope of the present disclosure.

Many modifications of examples set forth herein will come to mind to one skilled in the art to which the present disclosure pertains having the benefit of the teachings presented in the foregoing descriptions and the associated drawings.

Therefore, it is to be understood that the present disclosure is not to be limited to the specific examples illustrated and that modifications and other examples are intended to be included within the scope of the appended claims. Moreover, although the foregoing description and the associated drawings describe examples of the present disclosure in the context of certain illustrative combinations of elements and/or functions, it should be appreciated that different combinations of elements and/or functions may be provided by alternative implementations without departing from the scope of the appended claims. Accordingly, parenthetical reference numerals in the appended claims are presented for illustrative purposes only and are not intended to limit the scope of the claimed subject matter to the specific examples provided in the present disclosure.

What is claimed is:

1. A system comprising:
   a scanner;
   a robotic manipulator; and
   a system controller configured to perform operations comprising:
      obtaining a feature-based local coordinate system for a first feature of a first part and a second feature of a second part, wherein the feature-based local coordinate system is different from a global coordinate system and wherein the feature-based local coordinate system is independent from the global coordinate system and a part coordinate system for the first part or the second part;
      determining a specified dimension between the first feature and the second feature in the feature-based local coordinate system based on a design model;
      scanning, with the scanner, the first feature and the second feature;
      determining, based on the scanning, an identified dimension corresponding to the specified dimension;
      comparing the specified dimension to the identified dimension; and
      adjusting, with the robotic manipulator controlled in accordance with the feature-based local coordinate system, a position of the first part relative to the second part until a difference between the specified dimension and the identified dimension is within a corresponding range, wherein the adjusting includes moving the first and second part towards each other to align the first feature relative to the second feature.

2. The system of claim 1, wherein the obtaining the feature-based local coordinate system comprises:
   detecting, with the scanner, the first feature of a first part and the second feature of the second part;
   selecting the first feature and the second feature; and
   constructing the feature-based local coordinate system based on the first feature and the second feature, wherein first feature is a datum in the feature-based local coordinate system.

3. The system of claim 2, wherein the detecting the first feature of the first part and the second feature of the second part is simultaneous, and wherein the first feature and the second feature are selected based on simultaneous detectability of the first feature and the second feature with the scanner.

4. The system of claim 2, wherein the first feature of the first part and the second feature of the second part are selected based on an expected orientation of the first feature and the second feature.

5. The system of claim 2, wherein the selecting the first feature and the second feature comprises selecting at least one of the first feature and the second feature from the group consisting of an edge, a plane, and a contoured feature.

6. The system of claim 2, wherein the selecting the first feature and the second feature comprises geometrically constructing a geometric feature based on one or more of physical features of the first and second features.

7. The system of claim 2, wherein the operations further comprise:
   selecting a third feature of the first part within the first part, wherein a direction of a specified dimension between the third feature and the second feature is selected as an additional axis of the feature-based local coordinate system.

8. The system of claim 1, wherein the adjusting the robotic manipulator ignores an orientation of the first part as a whole and an orientation of the second part as a whole.

9. The system of claim 1, wherein the operations further comprise:
   positioning, with the robotic manipulator, the first part relative to the second part such that the first feature of the first part and the second feature of the second part are within a field of view of the scanner.

10. The system of claim 1, wherein the operations further comprise:
    determining, based on the comparing, that the difference between the specified dimension and the identified dimension is outside of the corresponding range, wherein the adjusting is based on the determining that the difference is outside of the corresponding range.

11. The system of claim 1, wherein the adjusting the position of the first part relative to the second part is further performed based on referencing the part-based coordinate system of the first part to the part-based coordinate system of the second part, wherein the part-based coordinate system of the first part is referenced to the global coordinate system and is different from the feature-based local coordinate system, —and wherein the part-based coordinate system of the second part is referenced to the global coordinate system and is different from the feature-based local coordinate system.

12. The system of claim 1, wherein the identified dimension is a first identified dimension, wherein the specified dimension is a first specified dimension, and wherein the operations further comprise:
    determining, based on the scanning, a position of a third feature of the first part relative to a fourth feature of the second part;
    determining a second specified dimension between the third feature and the fourth feature;
    determining a second identified dimension between the third feature and the fourth feature;
    comparing the second specified dimension to the second identified dimension; and
    adjusting, with the robotic manipulator, a position of the first part relative to the second part based on the comparing the second specified dimension to the second identified dimension.

13. The system of claim 12, wherein the comparing the second specified dimension to the second identified dimension is performed using the feature-based local coordinate system.

14. The system of claim 12, wherein the comparing the second specified dimension to the second identified dimension is performed using an additional local feature-based coordinate system constructed based on the third feature and the fourth feature, wherein the additional feature-based local coordinate system is different from the global coordinate system and the feature-based local coordinate system.

15. The system of claim 1, wherein the feature-based local coordinate system differs from the global coordinate system in at least an axis direction when the first or second part becomes deformed as a whole.

16. The system of claim 1, wherein the scanning comprises simultaneously scanning the first feature and the second feature, wherein the simultaneously scanning comprises obtaining multiple point clouds for each of the first feature and the second feature and reconciling the multiple point clouds into a single point cloud for each of the first feature and the second feature, and wherein the determining the identified dimension is performed based on a comparison of the single point cloud for the first feature with the single point cloud for the second feature.

17. The system of claim 1, wherein the operations further comprise:
deriving a feature based on one or more physical features on the first part or the second part, wherein at least one of the first feature or the second feature is the derived feature.

18. The system of claim 1, wherein the robotic manipulator is a first robotic manipulator, and wherein the system further comprises:
a second robotic manipulator, configured to position the scanner.

19. The system of claim 1, wherein the first part and the second part are aircraft components, and wherein the scanner is a three-dimensional (3D) photogrammetry scanner.

20. A system comprising:
a scanner;
a robotic manipulator; and
a system controller configured to perform operations comprising:
simultaneously detecting, with the scanner, a first feature of a first part within a portion of the first part and a second feature of a second part within a portion of the second part;
selecting the first feature and the second feature;
constructing a feature-based local coordinate system based on selection of the first feature of a first part and the second feature of a second part, wherein the feature-based local coordinate system is independent from a global coordinate system and a part coordinate system for the first part or the second part;
determining a specified dimension between the first feature and the second feature in the feature-based local coordinate system based on a design model;
simultaneously scanning, with the scanner, the first feature and the second feature;
determining, based on the scanning, an identified dimension corresponding to the specified dimension;
comparing the specified dimension to the identified dimension; and
adjusting, with the robotic manipulator controlled in accordance with the feature-based local coordinate system, a position of the first part relative to the second part until a difference between the specified dimension and the identified dimension is within a corresponding range, wherein the adjusting includes moving the first and second part towards each other to align the first feature relative to the second feature.

* * * * *